United States Patent
Shi et al.

(10) Patent No.: US 7,720,305 B2
(45) Date of Patent: May 18, 2010

(54) SYSTEM AND METHOD FOR ROBUST LOSSLESS DATA HIDING AND RECOVERING FROM THE INTEGER WAVELET REPRESENTATION

(75) Inventors: Yun-Qing Shi, Millburn, NJ (US); Dekun Zou, Kearny, NJ (US); Zhicheng Ni, Kearny, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 882 days.

(21) Appl. No.: 11/004,040

(22) Filed: Dec. 3, 2004

(65) Prior Publication Data

US 2005/0129271 A1    Jun. 16, 2005

Related U.S. Application Data

(60) Provisional application No. 60/527,900, filed on Dec. 5, 2003.

(51) Int. Cl.
*G06K 9/40* (2006.01)

(52) U.S. Cl. .................. 382/275; 382/100

(58) Field of Classification Search ............. 382/100, 382/240, 275; 375/240.19; 348/398.1
See application file for complete search history.

(56) References Cited

U.S. PATENT DOCUMENTS

| | | | |
|---|---|---|---|
| 5,802,481 A * | 9/1998 | Prieto | 702/190 |
| 6,226,387 B1 * | 5/2001 | Tewfik et al. | 382/100 |
| 6,259,819 B1 * | 7/2001 | Andrew et al. | 382/248 |
| 6,278,791 B1 | 8/2001 | Honsinger et al. | |
| 6,396,958 B1 * | 5/2002 | Wilson | 382/246 |
| 6,477,276 B1 * | 11/2002 | Inoue et al. | 382/232 |
| 6,574,372 B2 * | 6/2003 | Ratnakar | 382/240 |
| 6,633,652 B1 | 10/2003 | Donescu | |
| 6,647,149 B2 * | 11/2003 | Keeney et al. | 382/240 |
| 6,693,965 B1 * | 2/2004 | Inoue et al. | 375/240.19 |
| 6,718,045 B2 * | 4/2004 | Donescu et al. | 382/100 |
| 6,788,821 B2 | 9/2004 | Inoue et al. | |
| 7,031,491 B1 * | 4/2006 | Donescu et al. | 382/100 |
| 7,146,502 B2 | 12/2006 | Hayashi et al. | |
| 7,286,711 B2 * | 10/2007 | Bottou et al. | 382/240 |

(Continued)

FOREIGN PATENT DOCUMENTS

JP    11-196262    7/1999

(Continued)

OTHER PUBLICATIONS

Laurance et al., Embedded DCT Coding with Significance Masking, Apr. 21-24, 1997, ICASSP-97, vol. 4, pp. 2717-2720.*

(Continued)

*Primary Examiner*—John B Strege
*Assistant Examiner*—Dennis Rosario
(74) *Attorney, Agent, or Firm*—Connolly Bove Lodge & Hutz LLP

(57) ABSTRACT

A method is provided which comprises providing a block of IWT (integer wavelet transform) coefficients for preferably one high frequency sub-band of an image; determining a mean value of said coefficients within said block; and establishing an encoded mean value to embed one of a logical-0 bit value and a logical-1 bit into said first block.

19 Claims, 12 Drawing Sheets

$$\begin{pmatrix} 0 & 0 & 0 & \cdots & 0 & 0 & 0 \\ 0 & 1 & 1 & \cdots & 1 & 1 & 0 \\ 0 & 1 & 1 & \cdots & 1 & 1 & 0 \\ \vdots & \vdots & \vdots & & \vdots & \vdots & \vdots \\ 0 & 1 & 1 & \cdots & 1 & 1 & 0 \\ 0 & 1 & 1 & \cdots & 1 & 1 & 0 \\ 0 & 0 & 0 & \cdots & 0 & 0 & 0 \end{pmatrix}$$

U.S. PATENT DOCUMENTS

| | | | |
|---|---|---|---|
| 7,292,708 B2* | 11/2007 | Lee et al. | 382/100 |
| 7,421,128 B2* | 9/2008 | Venkatesan et al. | 382/232 |
| 2002/0154778 A1 | 10/2002 | Mihcak et al. | |
| 2003/0081809 A1 | 5/2003 | Fridrich et al. | |

FOREIGN PATENT DOCUMENTS

| | | |
|---|---|---|
| JP | 2002-094780 | 3/2002 |
| JP | 2002-247338 | 8/2002 |
| WO | 2005/057905 A3 | 5/2007 |

OTHER PUBLICATIONS

Macq et al., Trusted Headers for Medical Images, DFG VIII-D II Watermarking Workshop, Jul. 27, 1999, pp. 1-13.

Zou et al., A Content-Based Image Authentication System With Lossless Data Hiding, Proc. of IEEE Int'l Conference on Multimedia and Expo, Jul. 2003, vol. 2, pp. 6-9.

Fridrich et al., Invertible Authentication, Proc. of SPIE, Security and Watermarking of Multimedia Contents, vol. 4314, Jan. 2001, pp. 197-208.

Goljan et al., Distortion-Free Data Embedding for Images, Proc. of 4th Information Hiding Workshop, vol. 2137, Apr. 2001, pp. 1-15.

Xuan et al., Distortionless Data Hiding Based On Integer Wavelet Transform, IEEE Electronics Letter, vol. 38, Issue 25, Dec. 2002, pp. 1646-1648.

Ni et al., Reversible Data Hiding, Proc. of Int'l Symposium on Circuits and Systems, May 2003, vol. 2, pp. 912-915.

De Vleeschouwer et al., Circular Interpretation of Bijective Transformations In Lossless Watermarking for Media . . . , IEEE Trans. on Multimedia, Mar. 2003, vol. 5, pp. 97-105.

Skodras et al., The JPEG 2000 Still Image Compression Standard, IEEE Signal Processing Magazine,Sep. 2001, vol. 18, Issue 5, pp. 36-58.

Christopoulos et al., The JPEG2000 Still Image Coding System: An Overview, IEEE Trans. On Consumer Electronics, Nov. 2000, vol. 46, No. 4.

Le Gall et al., Sub-Band Coding Of Digital Images Using Symmetric Short Kernel Filters and Arithmetic . . . , Proc. of IEEE Int'l Conf. on Acoustics, Speech . . . , 1988, pp. 761-764.

Calderbank et al., Wavelet Transforms That Map Integers To Integers, Applied and Computational Harmonic Analysis, 1998, vol. 5, pp. 332-369.

Coding of Still Pictures, JPEG 2000 Part I Final Committee Draft Version 1.0, Mar. 16, 2000, ISO/IEC JTC 1/SC 29 WG 1 N1646R, pp. 109-125.

J. G. Proakis, Digital Communications, Fourth Edition, 2000, pp. 438-439.

Voyatzis et al., Chaotic Mixing Of Digital Images And Applications To Watermarking, Proceedings of European Conf. of Multimedia Applns., Servs. and Techs., May 1996, pp. 687-695.

PCT/US2004/040442, International Preliminary Report on Patentability, Issue Date: Apr. 3, 2007.

Office Action issued in counterpart Japanese Application No. 2006-542769 on May 27, 2008.

* cited by examiner

FIG. 4
$$\begin{pmatrix} 0 & 0 & 0 & \cdots & 0 & 0 & 0 \\ 0 & 1 & 1 & \cdots & 1 & 1 & 0 \\ 0 & 1 & 1 & \cdots & 1 & 1 & 0 \\ \vdots & \vdots & \vdots & & \vdots & \vdots & \vdots \\ 0 & 1 & 1 & \cdots & 1 & 1 & 0 \\ 0 & 1 & 1 & \cdots & 1 & 1 & 0 \\ 0 & 0 & 0 & \cdots & 0 & 0 & 0 \end{pmatrix}$$
FIG. 5A
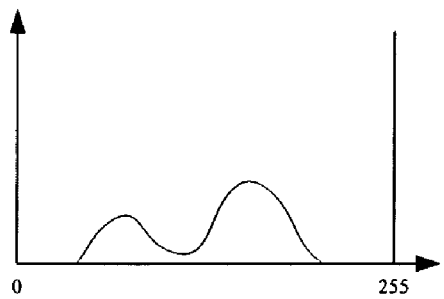
FIG. 5B
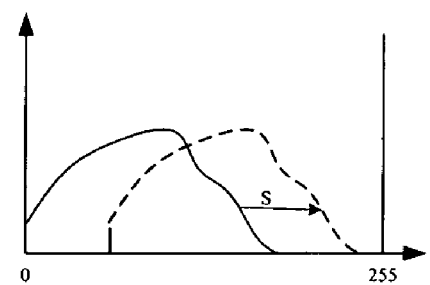
FIG. 5C
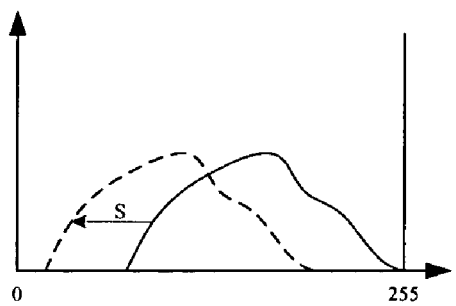
FIG. 5D
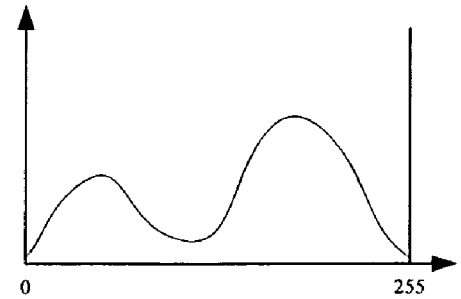

FIG. 6

5/3 FILTER COEFFICIENTS

| i | Analysis Filter Coefficients | | Synthesis Filter Coefficients | |
|---|---|---|---|---|
| | Low-pass Filter $h_L(i)$ | High-pass Filter $h_H(i)$ | Low-pass Filter $g_L(i)$ | High-pass Filter $g_H(i)$ |
| 0 | 6/8 | 1 | 1 | 6/8 |
| ±1 | 2/8 | -1/2 | 1/2 | -2/8 |
| ±2 | -1/8 | 0 | 0 | -1/8 |

FIG. 7

$$G_{HL} = \begin{bmatrix} -\frac{1}{16} & -\frac{1}{8} & \frac{3}{8} & -\frac{1}{8} & -\frac{1}{16} \\ -\frac{1}{8} & -\frac{2}{8} & \frac{6}{8} & -\frac{2}{8} & -\frac{1}{8} \\ -\frac{1}{16} & -\frac{1}{8} & \frac{3}{8} & -\frac{1}{8} & -\frac{1}{16} \end{bmatrix}$$

$$G_{LH} = \begin{bmatrix} -\frac{1}{16} & -\frac{1}{8} & -\frac{1}{16} \\ -\frac{1}{8} & -\frac{2}{8} & -\frac{1}{8} \\ \frac{3}{8} & \frac{6}{8} & \frac{3}{8} \\ -\frac{1}{8} & -\frac{2}{8} & -\frac{1}{8} \\ -\frac{1}{16} & -\frac{1}{8} & -\frac{1}{16} \end{bmatrix}$$

$$G_{LL} = \begin{bmatrix} \frac{1}{4} & \frac{1}{2} & \frac{1}{4} \\ \frac{1}{2} & 1 & \frac{1}{2} \\ \frac{1}{4} & \frac{1}{2} & \frac{1}{4} \end{bmatrix}$$

$$R = \begin{bmatrix} 0 & 0 & \frac{1}{2} & 0 & 0 \\ 0 & 0 & 1 & 0 & 0 \\ 0 & 0 & \frac{1}{2} & 0 & 0 \end{bmatrix}$$

FIG. 16
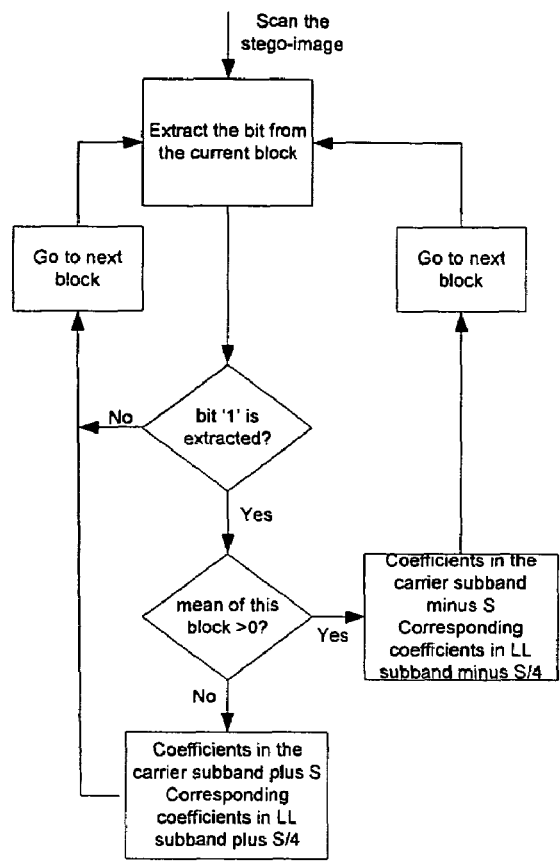
FIG. 17  FIG. 18
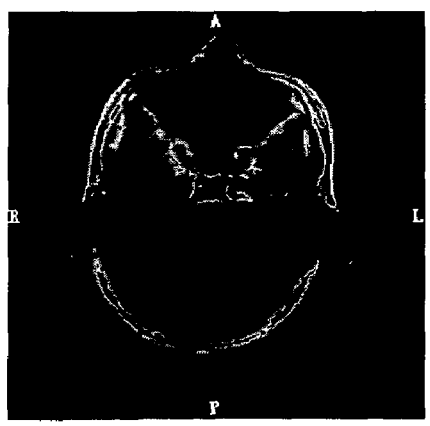 

FIG. 19
| Block size | ECC Scheme | Capacity with ECC (bits) | Capacity without ECC (bits) |
|---|---|---|---|
| 5 | (15,11) | 1907 | 2601 |
| 6 | (15,11) | 1293 | 1764 |
| 7 | (15,11) | 950 | 1296 |
| 8 | (15,11) | 750 | 1024 |
| 9 | (15,11) | 574 | 784 |
| 10 | (15,11) | 458 | 625 |
| 11 | (15,11) | 387 | 529 |
| 12 | (15,11) | 323 | 441 |
FIG. 20
| Block size | $m_{max}$ in $HL_1$ | $m_{max}$ in $LH_1$ | Minimum shift values | PSNR (dB) |
|---|---|---|---|---|
| 5 | 16.56 | 7.78 | 8 | 40.09 |
| 6 | 10.25 | 4.56 | 6 | 41.87 |
| 7 | 9.64 | 2.72 | 4 | 44.81 |
| 8 | 6.14 | 2.64 | 4 | 44.36 |
| 9 | 4.31 | 2.63 | 4 | 44.18 |
| 10 | 4.00 | 1.84 | 2 | 49.86 |
| 11 | 3.41 | 1.69 | 2 | 49.62 |
| 12 | 3.18 | 1.55 | 2 | 49.46 |
FIG. 21
FIG. 22

| PSNR(dB) | | Block Size | | | | | | | |
|---|---|---|---|---|---|---|---|---|---|
| | | 5 | 6 | 7 | 8 | 9 | 10 | 11 | 12 |
| Shift Value | 2 | - | - | - | - | - | 49.86 | 49.62 | 49.46 |
| | 4 | - | - | 44.81 | 44.36 | 44.18 | 44.08 | 43.80 | 43.63 |
| | 6 | - | 41.87 | 41.30 | 40.84 | 40.67 | 40.55 | 40.28 | 40.12 |
| | 8 | 40.09 | 39.44 | 38.85 | 38.39 | 38.20 | 38.10 | 37.83 | 37.66 |
| | 10 | 38.14 | 37.48 | 36.89 | 36.43 | 36.26 | 36.15 | 35.88 | 35.71 |
| | 12 | 36.57 | 35.91 | 35.32 | 34.86 | 34.68 | 34.57 | 34.30 | 34.14 |
| | 14 | 35.23 | 34.57 | 33.98 | 33.52 | 33.34 | 33.23 | 32.96 | 32.79 |
| | 16 | 34.08 | 33.42 | 32.83 | 32.37 | 32.18 | 32.08 | 31.81 | 31.64 |
| | 18 | 33.05 | 32.38 | 31.80 | 31.34 | 31.16 | 31.05 | 30.78 | 30.61 |
| | 20 | 32.13 | 31.47 | 30.89 | 30.43 | 30.24 | 30.15 | 29.86 | 29.70 |

FIG. 25

| Decoded error bits | Block Size | | | | | | | |
|---|---|---|---|---|---|---|---|---|
| | 5 | 6 | 7 | 8 | 9 | 10 | 11 | 12 |
| Shift Value | 2 | - | - | - | - | - | 228 | 197 | 164 |
| | 4 | - | - | 477 | 383 | 291 | 228 | 197 | 164 |
| | 6 | - | 643 | 474 | 381 | 275 | 167 | 154 | 131 |
| | 8 | 940 | 643 | 359 | 262 | 203 | 91 | 70 | 78 |
| | 10 | 940 | 616 | 237 | 160 | 136 | 50 | 37 | 10 |
| | 12 | 940 | 485 | 129 | 89 | 79 | 13 | 7 | 0 |
| | 14 | 940 | 398 | 82 | 32 | 35 | 0 | 0 | 0 |
| | 16 | 940 | 269 | 40 | 14 | 16 | 0 | 0 | 0 |
| | 18 | 938 | 199 | 28 | 2 | 11 | 0 | 0 | 0 |
| | 20 | 747 | 128 | 11 | 1 | 10 | 0 | 0 | 0 |

FIG. 26

| Decoded error bits | Block Size | | | | | | | |
|---|---|---|---|---|---|---|---|---|
| | 5 | 6 | 7 | 8 | 9 | 10 | 11 | 12 |
| Shift Value | 2 | - | - | - | - | - | 140 | 137 | 121 |
| | 4 | - | - | 200 | 120 | 46 | 27 | 10 | 0 |
| | 6 | - | 313 | 111 | 32 | 8 | 4 | 0 | 0 |
| | 8 | 657 | 236 | 87 | 18 | 3 | 0 | 0 | 0 |
| | 10 | 312 | 159 | 19 | 9 | 0 | 0 | 0 | 0 |
| | 12 | 46 | 28 | 4 | 2 | 0 | 0 | 0 | 0 |
| | 14 | 14 | 6 | 0 | 0 | 0 | 0 | 0 | 0 |
| | 16 | 0 | 0 | 0 | 0 | 0 | 0 | 0 | 0 |
| | 18 | 0 | 0 | 0 | 0 | 0 | 0 | 0 | 0 |
| | 20 | 0 | 0 | 0 | 0 | 0 | 0 | 0 | 0 |

SYSTEM AND METHOD FOR ROBUST LOSSLESS DATA HIDING AND RECOVERING FROM THE INTEGER WAVELET REPRESENTATION

CROSS-REFERENCE TO RELATED APPLICATIONS

This application claims the benefit of U.S. Provisional Patent Application Ser. No. 60/527,900, entitled "ROBUST LOSSLESS IMAGE DATA HIDING IN INTEGER WAVELET DOMAIN," filed Dec. 5, 2003, the entire disclosure of which is incorporated herein by reference.

BACKGROUND OF THE INVENTION

The present invention relates to methods and apparatus for embedding data in an image and recovering the embedded data therefrom.

Data hiding, also known as data concealing, is a process for embedding useful data (information) into a cover media, such as image data. Cover media with data embedded therein is referred to herein as "marked media." Data hiding may be employed for the purposes of identification, annotation, copyright protection, and authentication. In such applications, the hidden data and the cover media may be closely related. This type of data embedding is often referred to as watermarking or more generally as "marking." It is desirable for the hidden data to be perceptually transparent. Otherwise stated, the marked media should resemble the cover media as closely as possible.

The cover media will generally experience some distortion due to the presence of embedded data. Moreover, even after the embedded data are removed, it is generally difficult to restore the cover media to the condition it was in prior to embedding the data. Specifically, some permanent distortion of the cover media generally remains even after the hidden data have been extracted. The sources of distortion include round-off error, truncation error, and quantization error. This distortion presents a problem since for some applications such as medical diagnosis and law enforcement, it is important to accurately restore the cover media to the pre-embedding condition once the hidden data have been retrieved. The marking techniques satisfying this requirement are referred to as lossless or distortionless. Such marking techniques are also known as reversible marking techniques and are generally suitable for applications where the original media data should be accurately recovered.

Recently, some lossless marking techniques have been reported in the literature. The first method is carried out in the image spatial domain. See U.S. Pat. No. 6,278,791, issued Aug. 21, 2001, entitled "Lossless Recovery of an Original Image Containing Embedded Data," by C. W. Honsinger, P. Jones, M. Rabbani, and J. C. Stoffel (referred to herein as "Honsinger"), the disclosure of which is hereby incorporated herein by reference.

Another spatial domain technique was reported in Fridrich. J. Fridrich, M. Goljan and R. Du, "Invertible authentication," Proc. SPIE, Security and Watermarking of Multimedia Contents, San Jose, Calif., January (2001) (referred to herein as "Fridrich"). The entire disclosure of this document is hereby incorporated herein by reference. There also exists a distortionless marking technique in the transform domain. B. Macq and F. Deweyand, "Trusted headers for medical images," DFG VIII-D II Watermarking Workshop, Erlangen, Germany, October 1999 (referred to herein as "Macq"). The entire disclosure of this document is hereby incorporated herein by reference.

The capacity of the method reported in "De Vleeschouwer" is also very limited except that it exhibits robustness against high quality JPEG compression. C. De Vleeschouwer, J. F. Delaigle and B. Macq, "Circular interpretation on histogram for reversible watermarking," IEEE International Multimedia Signal Processing Workshop, Cannes, France, pp. 345-350, October 2001 (referred to herein as "De Vleeschouwer") The entire disclosure of this document is hereby incorporated herein by reference. These techniques are directed to authentication rather than to data hiding, and the total quantity of data embedded in the cover media is therefore limited.

The first lossless marking technique that is suitable for high embedding rate data hiding was presented in Goljan, M. Goljan, J. Fridrich, and R. Du, "Distortion-free data embedding," Proceedings of $4^{th}$ Information Hiding Workshop, Pittsburgh, Pa., April, 2001 (referred to herein as Goljan), the entire disclosure of which document is hereby incorporated herein by reference. In Goljan, the pixels in an image are divided into non-overlapped blocks, each block consisting of a number of adjacent pixels. For instance, this block could be a horizontal block having four consecutive pixels. A discrimination function is established to classify the blocks into three different categories: Regular, Singular, and Unusable. The authors used the discrimination function to capture the smoothness of the groups.

An invertible operation can be applied to groups. Specifically, the invertible operation can map a gray-level value to another gray-level value. This operation is invertible since applying it to a gray level value twice produces the original gray level value. This invertible operation is therefore called "flipping." For typical images, flipping with a small amplitude will lead to an increase of the discrimination function, resulting in more regular groups and fewer singular groups. It is this bias that enables distortionless data hiding. While this approach hides data without distorting the cover data, the quantity of data which may be hidden employing this technique is still not large enough for certain applications. The payload was estimated to be in a range from 3,000 bits to 24,000 bits for a 512×512×8 gray image according to Goljan. Another problem with the method is that as the quantity of data embedded in the image increases, the visual quality of the image decreases. For instance, the PSNR (Peak Signal to Noise Ratio) may drop as low as 35 dB (decibels), and some undesired artifacts may appear in the image.

A method by Xuan, based on the integer wavelet transform, is a recently proposed reversible data hiding technique that can embed a large quantity of data. Guorong Xuan, Jidong Chen, Jiang Zhu, Yun Q. Shi, Zhicheng Ni, Wei Su, "Distortionless Data Hiding Based on Integer Wavelet Transform," IEEE International Workshop on Multimedia Signal Processing, St. Thomas, US Virgin islands, December 2002 (referred to herein as "Xuan"). This document is hereby incorporated herein by reference. The main idea in Xuan is as follows. After the integer wavelet transform is applied to the original image, the bias between binary ones and binary zeroes in the bit-planes of the sub-bands LH, HL, and HH is significantly increased. Hence, the ones and zeroes in these bit planes can be losslessly compressed to leave a lot of storage space for data embedding. After data embedding, an inverse integer wavelet transform is applied to form the marked image. The capacity achieved in this technique is quite large. The PSNR of the marked image is, however, not high due to the histogram modification applied in order to avoid overflow or underflow conditions. For some images, the PSNR is only 28 dB.

One method based on histogram manipulation is a recently disclosed lossless data hiding technique, which can embed a large amount of data (5 k-80 k bits for a 512×512×8 grayscale image) while preserving high visual quality (the PSNR is guaranteed to be above 48 dB) for a vast majority of images. Z. Ni, Y. Q. Shi, N. Ansari and W. Su, "Reversible data hiding," IEEE International Symposium on Circuits and Systems, May 2003, Bangkok, Thailand, (referred to herein as "Ni"). This document is hereby incorporated herein by reference. This document (Ni) is not conceded to be prior art merely through its placement in the "Background of the Invention" section of this patent application.

However, only one prior lossless data hiding technique (De Vleeschouwer) is robust against compression applied to the stego-image (the image including the embedded data). Specifically, only in Vleeschouwer can the hidden data still be extracted out correctly after the stego-media has gone through compression. With the other existing techniques, the embedded data cannot be recovered without error after stego-media compression.

With reference to FIGS. 1A and B, while the De Vleeschouwer technique is robust to compression, it generates annoying salt-and-pepper noise because it uses modulo-256 addition. That is, when the pixel grayscale value is close to 256 (brightest) and/or 0 (darkest), the modulo-256 addition will likely cause flipping over between the brightest and darkest gray values. This often happens with medical images. This type of salt-pepper noise is unacceptable for many applications.

Therefore, there is a need in the art for a system and method for embedding an amount of robust data into cover media in a reversible manner (the original cover media can be reserved without salt-and-pepper noise).

SUMMARY OF THE INVENTION

A method is provided which comprises providing a block of IWT (integer wavelet transform) coefficients for at least one frequency sub-band of an image; determining a mean value of said coefficients within the block; and establishing an encoded mean value to embed one of a logical-0 bit value and a logical-1 bit into the first block.

Other aspects, features, advantages, etc. will become apparent to one skilled in the art when the description of the preferred embodiments of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

FIG. 4 is a matrix including information identifying a mask for use in determining which of a group of IWT coefficients are to be modified during a data embedding operation conducted in accordance with one or more aspects of the present invention;

FIGS. 5A-5D are histograms showing distributions of spatial-domain grayscale values for pixels of a block of an image for four respective categories of blocks for marking in accordance with one or more aspects of the present invention;

FIG. 6 is a data table showing the filter coefficients of a 5/3 wavelet filter suitable for use in accordance with one or more aspects of the present invention;

FIG. 7 illustrates a matrix showing the unit step response in the spatial domain for a change in the value of an IWT coefficient at the (i, j) position in the HL1 sub-band in accordance with one or more aspects of the present invention;

FIG. 16 is a flow diagram for a method for restoring cover media data in accordance with one or more aspects of the present invention;

FIG. 17 is an illustration of a medical image that has been marked in accordance with preferred data embedding method in accordance with one or more aspects of the present invention;

FIG. 18 is an illustration of a test (N1A) image that has been marked in accordance with preferred data embedding method in accordance with one or more aspects of the present invention;

FIG. 19 is a data table of experimental results correlating block size and data storage capacity when marking an image employing a method in accordance with one or more aspects of the present invention;

FIG. 20 is a data table of experimental results illustrating the effect of block size on mean block coefficient value in accordance with one or more aspects of the present invention;

FIG. 21 illustrates an image that has been marked using the variables block size=5 and shift quantity=8, yielding a PSNR (peak signal to noise ratio) of 40.09 dB (decibels) in accordance with one or more aspects of the present invention;

FIG. 22 illustrates an image that has been marked using the variables block size=12 and shift quantity=2, yielding a PSNR of 49.46 dB in accordance with one or more aspects of the present invention;

FIG. 25 is a data table showing test results employing a 3×3 median filter in accordance with one or more aspects of the present invention; and FIG. 26 is a data table showing test results in the presence of additive Gaussian noise having a zero mean and a variance of 0.001 in accordance with one or more aspects of the present invention.

DETAILED DESCRIPTION OF THE PREFERRED EMBODIMENTS

Figure 1A:
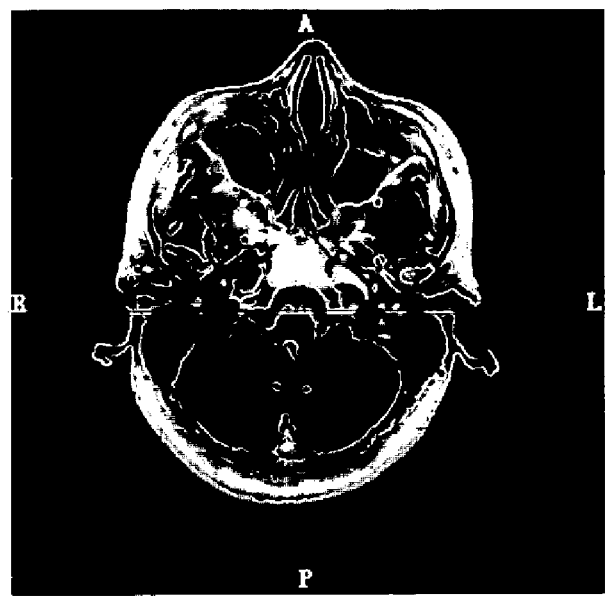
FIGS. 1A-B are images illustrating an undesirable salt-and-pepper effect that occurs using conventional data hiding techniques.
Figure 1B:
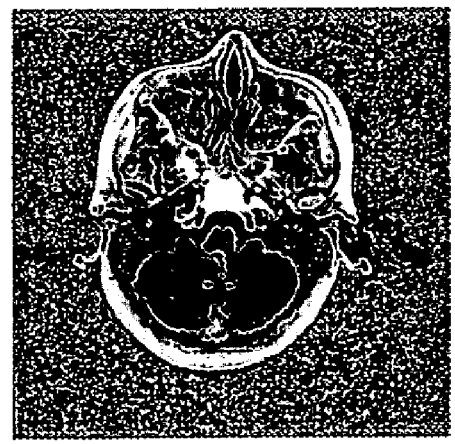
Figure 2:
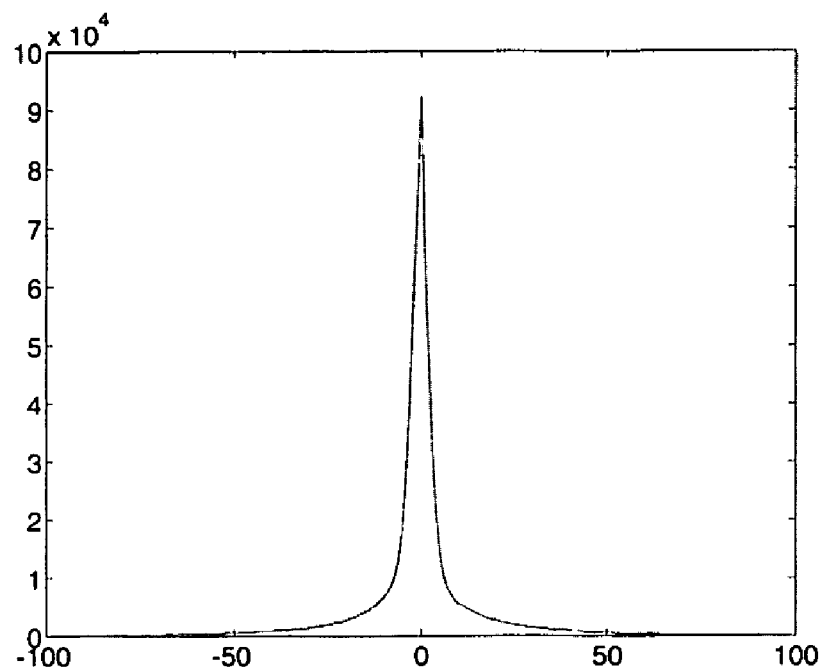
FIG. 2 is a graph illustrating a histogram of IWT coefficients in the HL1 sub-band for a test image (red color plane of a JPEG2000 test image, called N1A) suitable for marking in accordance with one or more aspects of the present invention.
Figure 3:
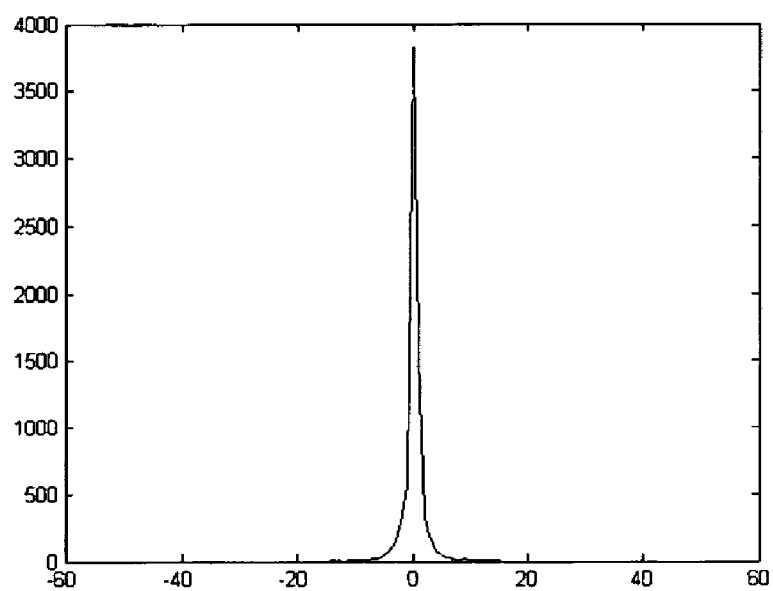
FIG. 3 is a graph illustrating a histogram of mean values of coefficients of 10×10 blocks in the HL1 sub-band of the N1A test image suitable for marking in accordance with one or more aspects of the present invention.

We have studied the features of image wavelet transforms and found out that coefficients of the high frequency sub-bands ($HL_n$, $LH_n$, or $HH_n$) have a zero-mean and Laplacian-like distribution. An example of this is the $HL_1$ sub-band of a N1A JPEG2000 test image, called N1A, depicted in FIG. 2 where the X-axis represents the IWT (Integer Wavelet Transform) coefficient values, while the Y-axis represents the numbers of coefficients that assume the respective coefficient values. We further divide this sub-band into non-overlapping square blocks with the side length B and calculate the mean of the coefficients values in each block.

$$\text{Mean}^{(t)} = \frac{1}{B^2} \sum_{i=1}^{B} \sum_{j=1}^{B} C_{ij}^{(t)} \quad (1)$$

where the superscript $^{(t)}$ indicates the $t^{th}$ block, and $C_{ij}^{(t)}$ denotes the IWT coefficients of the $t^{th}$ block. FIG. 3 illustrates one example of the distribution of these mean values. In FIG. 3, the X axis represents the mean values of the 10×10 non-overlapping blocks (i.e. side length B=10) in the $HL_1$ sub-band of the N1A JPEG2000 test image, and the Y axis represents the numbers of blocks that have the respective mean values. It can be observed that the variance of the mean values shown in FIG. 3 is much smaller than the variance of the coefficients themselves.

One aspect of our proposed semi-fragile lossless data hiding algorithm is to exploit this property. One bit of data will preferably be embedded into each of the non-overlapping blocks. At first, we scan all the blocks and find out the maximum absolute mean value of coefficients, denoted by $m_{max}$.

$$m_{max} = \text{Max}_t(|\text{mean}^{(t)}|) \quad (2)$$

Again, "t" denotes the block index, and Max denotes the operation to take maximum value. A threshold T is set to be the smallest integer number which is no less than the $m_{max}$. As a result, all blocks' mean values' absolute values will be less than or equal to T. Now, one bit can be embedded into each of the non-overlapping blocks by establishing (or manipulating) mean values of each of the blocks. If a logical-1 bit value is to be embedded into a block, the mean value of the block will be shifted in the direction away from 0 by a shift quantity S, which is preferably equal to or larger than T. If a logical-0 bit value is to be embedded, the block and the mean value of the IWT coefficients in the block are preferably left unchanged. Therefore, a mean value of coefficients of a block having an absolute value larger than T preferably represents a hidden binary "1" in the block. A mean coefficient value smaller than T preferably represents an embedded binary '0'.

Preferably, since the shift quantity S is fixed for all blocks, the original coefficients can be recovered by conducting the reverse operation, i.e., subtracting S from the IWT coefficients of blocks in which a logical-1 bit value ("1" bit) is embedded. Thus, the embedding operation is preferably reversible. As a result, the cover media can be restored without error if the stego image has not been distorted. Moreover, since we embed data by controlling the mean value of the IWT coefficients in one block, minor changes to the image caused by unintentional attacks such as JPEG/JPEG2000 compression will not cause the mean value to change much. Therefore, the correct detection of the hidden data is preferably still possible even if the stego-image is slightly altered. We verify this claim later in this application.

It should be pointed out that lossless watermarking is based on a principle of information theory that all original cover-media information should be preserved in the marked image throughout the lossless data hiding process. Therefore, if the marked images are subjected to lossy compression, the original cover media generally can no longer be recovered, since information about the original image may have been lost. It is also noted that we generally choose the $HL_1$ or $LH_1$ high frequency sub-bands to embed data. That is, though the mean value distribution of blocks of IWT coefficients of higher level high frequency sub-bands, $HL_n$ or $LH_n$ (n>1) also behave according to the theory presented above, we generally do not embed data in these high level IWT coefficients. This is because alterations to the higher level sub-bands can significantly degrade the image quality.

Proposed Lossless Data Hiding Algorithm

The issue of how to prevent overflow/underflow is addressed first. The proposed data embedding procedure is then presented.

Origin of Overflow/Underflow.

If all of the images we handle are in JPEG2000 format, the proposed method in the previous section would be sufficient. Let us assume that we have an image in the JPEG2000 format. We can have all the IWT coefficients derived from the image file through tier-2 decoding, followed by tier-1 decoding as disclosed in Christopoulos. C. Christopoulos, A. Skodras, T. Ebrahimi, "The JPEG2000 still image coding system: an overview," *IEEE Trans. On Consumer Electronics*, vol. 46, no. 4, pp. 1103-1127, November 2000 (referred to herein as "Christopoulos"). This document is hereby incorporated herein by reference.

Then, the hidden data can be embedded into the high frequency IWT coefficients. The changed coefficients can be encoded again to form a marked JPEG2000 file which is ready for applications such as transmission or printing. At the receiver end, the hidden data could be extracted from the marked JPEG2000 image file. If no alteration has been inflicted on the marked image, all the modified coefficients can preferably be shifted back to their original values, assuming that the data extraction procedure knows the value of the shift quantity used in the data embedding. We thus have the recovered version of the image which is preferably the same as the original one. This is because the JPEG2000 encoding preferably ensures that the wavelet coefficients are not truncated. See JPEG 2000 Part I Final Committee Draft Version 1.0. ISO/IEC JTC 1/SC 29/WG 1 N1646R Available: http://www.jpeg.org/public/fcd15444-1.pdf, the entire disclosure of which is hereby incorporated herein by reference). Hence, overflow and/or underflow preferably do not take place.

However, sometimes the stego-image may be converted into formats other than the JPEG2000 format. File format change should be considered permissible, and the original cover media should be preserved after the file format change. Nevertheless, we discovered that, sometimes, the recovered media may differ from the original media after the format changes from the JPEG2000 format to another format, such as, for instance, the bitmap format. This is because the pixel grayscale values in spatial domain are preferably represented by a fixed-length bit sequence (usually 8 bits, sometimes 16 bits). In a color image, each fundamental color component in a pixel is also often represented by 8 bits. After the IWT coefficients have been altered by the embedding operation, some pixels' grayscale values may be shifted out of the permitted grayscale value range as a result of the embedding operation. A typical grayscale range is 0-255 for an 8-bit grayscale image.

This phenomenon is referred to as overflow/underflow, which is explained in the following. In our algorithm, some IWT coefficients are modified in the data hiding operation. And, this change in coefficient values, upon transforming the blocks into the spatial domain, causes a related change in the pixel grayscale values in the spatial domain. Moreover, this change in pixel grayscale values may exceed the typical grayscale value limit range, such as 0 to 255, thereby causing an underflow condition and/or an overflow condition. Consequently, truncation generally occurs. Pixel grayscale values that are greater than 255 (overflow) are preferably set equal to 255, and those values that are smaller than zero (underflow) are preferably set equal to 0. From the information theory perspective, there is information loss in truncation, and thus the original image cannot be completely accurately recovered later, in the data extraction process.

Prevention of Overflow/Underflow.

Generally, as long as the pixel grayscale values of the marked image in the spatial domain remain in the permitted range, there is no overflow/underflow problem discussed above. In the following, it is assumed that the pixel grayscale values will be represented by 8 bits and that the permitted grayscale value range is [0,255]. If the permitted range is other than [0,255] for some images, the proposed principle remains valid, and the corresponding solution can be easily derived.

A preferred embodiment of the method is block-based. Specifically, the method preferably splits the selected high-frequency sub-band into non-overlapping blocks, and the data hiding is preferably carried out block by block. But the modification of the IWT coefficients in the blocks adjacent to a block under consideration can interfere with the grayscale values of the pixels corresponding to this block, which will become clear later in this document. Therefore, it is much easier for us to avoid the overflow/underflow if we can remove any interference from neighboring IWT-coefficient blocks. Therefore, the mask of FIG. 4 is preferably employed.

The outer elements on the bound of the mask are marked with '0's, and the inner elements by '1's. In the mask, a '0' identifies an IWT coefficient which will not be changed, while a '1' identifies a coefficient which will be changed during the data embedding process. In other words, at the bit embedding stage, in order to change the mean value of an IWT-coefficient block, we preferably only change those coefficients whose positions are associated with a '1' bit in the above mask and preferably keep the coefficients intact in the outer bound of the block. Using the IWT theory of Christopoulos, it is readily shown that when the IWT coefficients in the selected blocks are changed using the mask as illustrated in FIG. 4, the grayscale values of pixels in adjacent blocks will not be affected. That is, the interference among neighboring blocks is preferably eliminated employing this approach.

Once the interference among adjacent blocks has been removed, the discussion of preventing underflow/overflow can be focused on a single block. The basic idea is described in the following. Consider an IWT-coefficient block, $B_w$, and its corresponding block in the spatial domain, $B_s$. Here, the term "corresponding" refers to the group of pixels whose grayscale values are associated with the IWT-coefficient block. This correspondence relation can be readily determined according to the existing IWT theory. We assume that the absolute value of the maximum pixel grayscale value change is $S_{max}$. In $B_s$, overflow may occur if a) there are pixels having grayscale values greater than $(255-S_{max})$ and b) the grayscale values need to be increased as a consequence of the bit embedding process. Underflow may take place when there are pixels having grayscale values less than $S_{max}$ and the spatial-domain pixel grayscale values need to be decreased as a result of the bit-embedding process.

To avoid overflow and underflow, the above two scenarios should not occur. We call $[0, S_{max}]$ the 0-zone and $(255-S_{max}, 255)$ the 255-zone. In the spatial domain, we can classify a block into one of the four categories discussed below based on the placement of the pixel values of a block in relation to these two zones. In an ideal case, i.e. a type A block, no pixels are in the above-described zones, as illustrated in FIG. 5A. In this ideal case, we do not need to worry about the overflow/underflow problem.

If in the $B_s$ there exist pixels in 0-zone but no pixel in 255-zone, i.e. a type B block, as is illustrated by the solid line in FIG. 5B, the underflow problem can be avoided if the pixel grayscale values are only changed in the positive direction. The resulting histogram after data hiding is shown by the dotted line in FIG. 5B. In FIG. 5B, no pixel has a grayscale value greater than 255 or smaller than zero, indicating that no overflow/underflow will occur.

Preferably, with a type B block, if the mean coefficient value for the block is less than (i.e. more negative) than –T, the shift value is not applied to the block regardless of the value of the bit slated to be embedded in the block.

FIG. 5C depicts a case opposite the one in FIG. 5B. If there is no pixel of this block in the 0-zone, i.e. a type C block, it will be safe if all changes to the pixels in this group are decreases. The worst case is described by FIG. 5D, where pixels in the 0-zone, and pixels in the 255-zone are both present in a single block, i.e. a type D block. In this case, the mean coefficient value is preferably not shifted to avoid underflow or overflow. Thus, errors in data extraction may take place and some additional measure has to be taken. Error code correction is one way to address any errors embedded in blocks for the reasons described above. Measures for addressing errors in data extraction will be discussed later in this paper.

Prevention of Overflow/Underflow.

In the above, we have proposed a preferred system and method for embedding bits into the IWT coefficients and have discussed how to avoid overflow/underflow by considering the effects on the grayscale values of embedding bits as described above. In a preferred embodiment, if we can find a way to embed one bit into one block of the $HL_1$ or the $LH_1$ sub-bands, and the grayscale values of affected spatial-domain pixels all move only in a direction in which no truncation is necessary to occur, the overflow/underflow problem can be avoided. In the following, this issue is explored further.

In the JPEG2000 standard, the 5/3 wavelet filter bank is generally used as the default filter for reversible image encoding. The 5/3 filter bank was first proposed by Le Gall et. al in L. Gall and A. Tabatabai, "Sub-band coding of digital images using symmetric short kernel filters and arithmetic coding techniques", *Proc. of IEEE International Conference on Acoustics, Speech and Signal Processing*, NY, pp. 761-765, 1988 (referred to herein as "Gall"), the entire disclosure of which document is hereby incorporated herein by reference. The coefficients of the 5/3 wavelet filter bank are given in FIG. 6.

Our goal is to embed data into a high frequency sub-band of the integer wavelet transform (IWT) of an image. In this case, the effects of changing the wavelet coefficients on the spatial domain counterpart need to be investigated.

From FIG. 6, the synthesis filter can be represented using the Z transform as follows.

Low-pass filter:

$$G_L(z) = \frac{1}{2}z^{-1} + 1 + \frac{1}{2}z \qquad (3)$$

High-pass filter:

$$G_H(z) = -\frac{1}{8}z^{-2} - \frac{2}{8}z^{-1} + \frac{6}{8} - \frac{2}{8}z - \frac{1}{8}z^2 \qquad (4)$$

For a 2-D image, we have,

Low-pass filter in x axis:

$$G_{Lx}(z_x) = \frac{1}{2}z_x^{-1} + 1 + \frac{1}{2}z_x \qquad (5)$$

High-pass filter in x axis:

$$G_{Hx}(z_x) = -\frac{1}{8}z_x^{-2} - \frac{2}{8}z_x^{-1} + \frac{6}{8} - \frac{2}{8}z_x - \frac{1}{8}z_x^2 \qquad (6)$$

Low-pass filter in y axis:

$$G_{Ly}(z_y) = \frac{1}{2}z_y^{-1} + 1 + \frac{1}{2}z_y \qquad (7)$$

High-pass filter in y axis:

$$G_{Hy}(z_y) = -\frac{1}{8}z_y^{-2} - \frac{2}{8}z_y^{-1} + \frac{6}{8} - \frac{2}{8}z_y - \frac{1}{8}z_y^2 \qquad (8)$$

For the HL sub-band, the synthesis filter is to first apply the high-pass to the row (x direction), then apply low-pass to the column (y direction). The result is:

$$\begin{aligned}G_{HL}(z_x, z_y) &= G_{Hx}(z_x) \times G_{Ly}(z_y) \qquad (9)\\
&= \left(-\frac{1}{8}z_x^{-2} - \frac{2}{8}z_x^{-1} + \frac{6}{8} - \frac{2}{8}z_x - \frac{1}{8}z_x^2\right) \times \left(\frac{1}{2}z_y^{-1} + 1 + \frac{1}{2}z_y\right)\\
&= -\frac{1}{16}z_x^{-2}z_y^{-1} - \frac{1}{8}z_x^{-2} - \frac{1}{16}z_x^{-2}z_y - \frac{1}{8}z_x^{-1}z_y^{-1} - \frac{2}{8}z_x^{-1} -\\
&\quad \frac{1}{8}z_x^{-1}z_y + \frac{3}{8}z_y^{-1} + \frac{6}{8} + \frac{3}{8}z_y - \frac{1}{8}z_xz_y^{-1} - \frac{2}{8}z_x -\\
&\quad \frac{1}{8}z_xz_y - \frac{1}{16}z_x^2z_y^{-1} - \frac{1}{8}z_x^2 - \frac{1}{16}z_x^2z_y
\end{aligned}$$

For the LH sub-band, the synthesis filter is to first applies low-pass filtering to the rows (x direction), then applies high-pass filtering to the columns (y direction). The result is:

$$\begin{aligned}G_{LH}(z_x, z_y) &= G_{Lx}(z_x) \times G_{Hy}(z_y) \qquad (10)\\
&= \left(-\frac{1}{8}z_y^{-2} - \frac{2}{8}z_y^{-1} + \frac{6}{8} - \frac{2}{8}z_y - \frac{1}{8}z_y^2\right) \times \left(\frac{1}{2}z_x^{-1} + 1 + \frac{1}{2}z_x\right)\\
&= -\frac{1}{16}z_y^{-2}z_x^{-1} - \frac{1}{8}z_y^{-2} - \frac{1}{16}z_y^{-2}z_x - \frac{1}{8}z_y^{-1}z_x^{-1} - \frac{2}{8}z_y^{-1} -\\
&\quad \frac{1}{8}z_y^{-1}z_x + \frac{3}{8}z_x^{-1} + \frac{6}{8} + \frac{3}{8}z_x - \frac{1}{8}z_yz_x^{-1} - \frac{2}{8}z_y -\\
&\quad \frac{1}{8}z_yz_x - \frac{1}{16}z_y^2z_x^{-1} - \frac{1}{8}z_y^2 - \frac{1}{16}z_y^2z_x
\end{aligned}$$

For the LL sub-band, apply low-pass filter to both directions. The result is:

$$\begin{aligned}G_{LL}(z_x, z_y) &= G_{Lx}(z_x) \times G_{Ly}(z_y) \qquad (11)\\
&= \left(\frac{1}{2}z_x^{-1} + 1 + \frac{1}{2}z_x\right) \times \left(\frac{1}{2}z_y^{-1} + 1 + \frac{1}{2}z_y\right)\\
&= \frac{1}{4}z_x^{-1}z_y^{-1} + \frac{1}{2}z_x^{-1} + \frac{1}{4}z_x^{-1}z_y + \frac{1}{2}z_y^{-1} + 1 +\\
&\quad \frac{1}{2}z_y + \frac{1}{4}z_xz_y^{-1} + \frac{1}{2}z_x + \frac{1}{4}z_xz_y
\end{aligned}$$

From Formula (9), the unit step response in the spatial domain for a change occurring to an IWT coefficient located at the (i, j) position in the $HL_1$ sub-band can be expressed with the matrix $G_{HL}$ in FIG. 7. Specifically, an array of pixel grayscale values in the spatial domain centered at (2i−1, 2j) with a size of 3×5 (refer to FIG. 10) will change by the amount specified by the elements of this matrix (FIG. 7) if the IWT coefficient (i, j) in the $HL_1$ sub-band is increased by 1.

Figures 8, 9, 10:
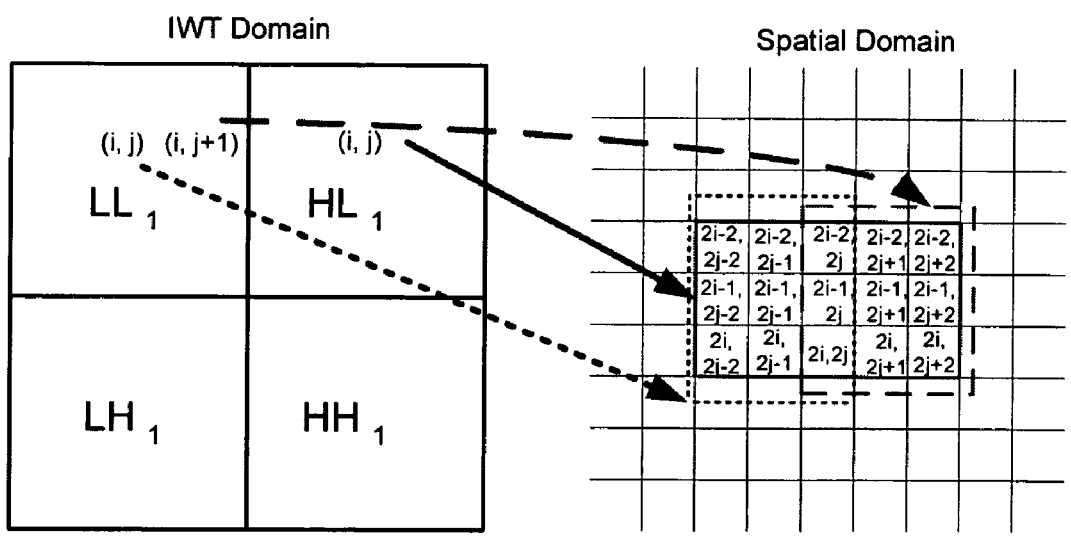
FIG. 8 illustrates a matrix showing the unit step response in the spatial domain for a change in the value of an IWT coefficient at the (i, j) position in the $LH_1$ sub-band in accordance with one or more aspects of the present invention.
FIG. 9 illustrates a matrix showing the unit step response in the spatial domain for a change in the value of an IWT coefficient at the (i, j) position in the $LH_1$ sub-band in accordance with one or more aspects of the present invention.
FIG. 10 is a block diagram showing the relationship between IWT coefficients and groups of affected pixels in the spatial domain in accordance with one or more aspects of the present invention.

The corresponding unit step responses can be found for the coefficients in $LH_1$ and $LL_1$ sub-bands, denoted by $G_{LH}$ and $G_{LL}$, respectively, as shown in FIGS. 8 and 9. They indicate the magnitude of changes of the grayscale value in the spatial domain if the IWT coefficient (i, j) in the $LH_1$ or $LL_1$ sub-band is increased by 1. The center is located at (2i, 2j−1) and (2i−1, 2j−1) for $G_{LH}$ and $G_{LL}$, respectively.

Assuming the $HL_1$ is the carrier sub-band, FIG. 7 indicates that the pixels affected by wavelet coefficients change will experience changes in their grayscale values in both increasing and decreasing directions. Similarly, this is true if the $LH_1$ is used as the carrier sub-band. According to the matrix in FIG. 9, the pixel grayscale values will move in only one direction. One preferred approach to combating overflow/underflow here is to manipulate coefficients in the LL sub-band to cause the resulting spatial-domain pixel grayscale value change to occur in only one direction.

First, let us consider a unit input into an HL1 coefficient with position (i,j), denoted by $\overline{C_{HL}(i,j)}$. We denote the output response in spatial domain by $k\overline{(i,j)}$, where k represents the amplitude, and $\overline{(i,j)}$ indicates the coordinates of the point in the spatial domain that is affected. The unit input described above and its response in the spatial domain are represented in the next equation.

$$\overline{C_{HL}(i,j)} \Leftrightarrow -\frac{1}{16}\overline{(2i-2, 2j-2)} - \frac{1}{8}\overline{(2i-1, 2j-2)} - \frac{1}{16}\overline{(2i, 2j-2)} - \frac{1}{8}\overline{(2i-2, 2j-1)} - \frac{2}{8}\overline{(2i-1, 2j-1)} - \frac{1}{8}\overline{(2i, 2j-1)} + \frac{3}{8}\overline{(2i-2, 2j)} + \frac{6}{8}\overline{(2i-1, 2j)} + \frac{3}{8}\overline{(2i, 2j)} - \frac{1}{8}\overline{(2i-2, 2j+1)} - \frac{2}{8}\overline{(2i-1, 2j+1)} - \frac{1}{8}\overline{(2i, 2j+1)} - \frac{1}{16}\overline{(2i-2, 2j+2)} - \frac{1}{8}\overline{(2i-1, 2j+2)} - \frac{1}{16}\overline{(2i, 2j+2)} \quad (12)$$

In the above equation, $$-\frac{1}{16}\overline{(2i-2, 2j-2)}$$

means that $$-\frac{1}{16}$$

is the response caused by the unit input to the HL1 coefficient at (i, j), $\overline{(2i-2, 2j-2)}$ means the response is located at (2i−2, 2j−2) in the spatial domain.

If a unit input is applied to an LL coefficient positioned at (i, j), the corresponding response is:

$$\overline{C_{LL}(i,j)} \Leftrightarrow \frac{1}{4}\overline{(2i-2, 2j-2)} + \frac{1}{2}\overline{(2i-2, 2j-1)} + \frac{1}{4}\overline{(2i-2, 2j)} + \frac{1}{2}\overline{(2i-1, 2j-2)} + 1\overline{(2i-1, 2j-1)} + \frac{1}{2}\overline{(2i-1, 2j)} + \frac{1}{4}\overline{(2i, 2j-2)} + \frac{1}{2}\overline{(2i, 2j-1)} + \frac{1}{4}\overline{(2i, 2j)} \quad (13)$$

We can verify that:

$$\overline{C_{HL}(i,j)} + \frac{1}{4}\overline{C_{LL}(i,j)} + \frac{1}{4}\overline{C_{LL}(i,j+1)} \Leftrightarrow \frac{1}{2}\overline{(2i-2, 2j)} + 1\overline{(2i-1, 2j)} + \frac{1}{2}\overline{(2i, 2j)} \quad (14)$$

It can be seen that if we change an HL1 coefficient at (i,j) by S and change both LL1 coefficients at (i,j) and (i,j+1) by S/4, the pixel value change in the spatial domain will have the same sign as S.

Similarly, for a coefficient at LH sub-band, we can get $$\overline{C_{LH}(i,j)} + \frac{1}{4}\overline{C_{LL}(i,j)} + \frac{1}{4}\overline{C_{LL}(i+1,j)} \Leftrightarrow \frac{1}{2}\overline{(2i, 2j-2)} + 1\overline{(2i, 2j-1)} + \frac{1}{2}\overline{(2i, 2j)} \quad (15)$$

The above formulae form the basis of our method which is described as follows. Now we study the unit response of LL coefficients. It can be deduced that for an $LL_1$ coefficient at (i, j), the center of the unit step response is at (2i−1, 2j−1) in the spatial domain, while the center of unit step response will be at (2i−1, 2j+1) for $LL_1$ coefficient (i, j+1). FIG. 10 illustrates the relationship of IWT coefficients and a resulting unit step response in the spatial domain. The solid arrow and the solid box are for the coefficient (i, j) in the $HL_1$ sub-band and the affected pixels in the spatial domain. The dotted arrow and dotted box are for $LL_1$ coefficient (i, j) and its affected pixels in the spatial domain. And, the dashed arrow and dashed box are for the $LL_1$ coefficient (i, j+1) and its affected pixels in the spatial domain.

It is observed that the combined 2-D arrays corresponding to the unit step responses of $LL_1$ coefficients (i, j) and (i, j+1) have a size of 3×5 and cover the exactly same group of pixels corresponding to the unit step response of the IWT $HL_1$ coefficient (i, j). We use $C_{HL}(i, j)$ to denote the coefficient at (i, j) of the $HL_1$ sub-band and $C_{LL}(i, j)$ to denote the coefficient at (i, j) of the $LL_1$ sub-band. Then, it is straightforward to verify that the combined effect of the unit step response of $C_{HL}(i, j)$, the ¼ of the unit step response of $C_{LL}(i, j)$, and the ¼ of the unit step response of $C_{LL}(i, j+1)$ can be expressed by the matrix in FIG. 11.

Figures 11, 12:
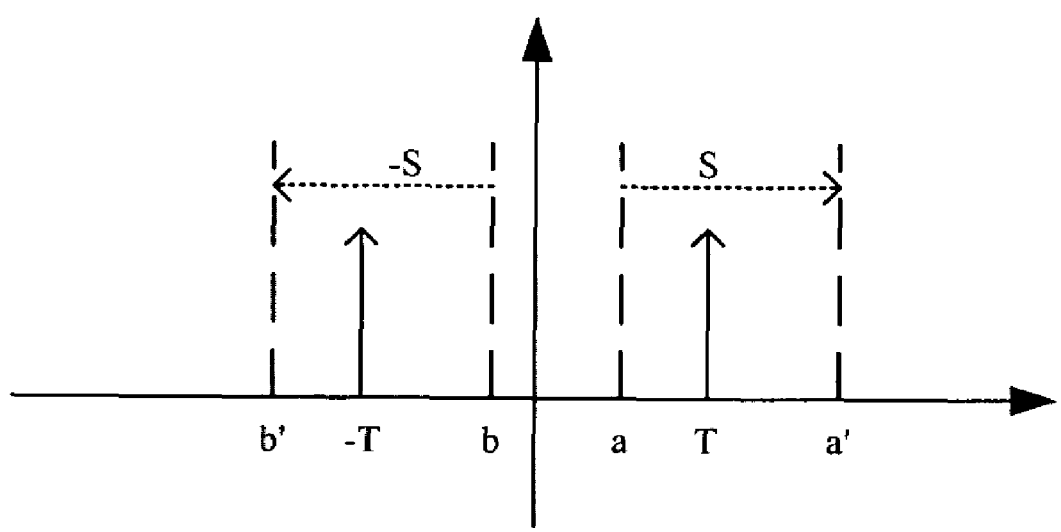
FIG. 11 is a matrix illustrating one quarter of the unit step response of $C_{LL}(i,j)$ and one quarter of the unit step response of $C_{LL}(i,j+1)$ in accordance with one or more aspects of the present invention.
FIG. 12 is a graph illustrating a data embedding rule for a block of type A in accordance with one or more aspects of the present invention.

The matrix of FIG. 11 indicates that all the changes in the spatial domain will preferably have the same sign. In other words, if we decide to embed data in the $HL_1$ sub-band, and if we change an $HL_1$ coefficient at (i,j) by S and change both $LL_1$ coefficients at (i,j) and (i,j+1) by S/4, the pixel grayscale value change in the spatial domain will have the same sign as S. It is noted that after the embedding, the maximum pixel grayscale value change in the spatial domain is also S. Similarly, if the $LH_1$ serves as the carrier sub-band, the same goal can be achieved by changing the $LH_1$ coefficient at (i,j) by S and both the $LL_1$ coefficients at (i,j) and (i+1, j) by S/4. In the next section, in which we present the proposed data embedding procedure, it becomes clear how overflow and underflow can be avoided.

Data Embedding

In a preferred embodiment, data can be embedded into sub-band HL1 or sub-band LH1. We will explain our method assuming HL1 is used. At first, HL1 sub-band is divided into non-overlapping blocks having a size N coefficients by N coefficients. In each block, the mean value is either 0 or close to zero. Equivalently, the absolute value of the mean should be less than a threshold 'T'. The basic idea is if a bit '1' is going to be embedded, the absolute mean value of the block will preferably be shifted away from 0 by a quantity larger than 'T'. Here, we do not change every coefficient of this block. Instead, we use the mask of FIG. 4. In this example, we only change those coefficients whose positions are marked with '1' in the above mask. In other words, we keep the outer bound of the block unchanged. By doing this, the effects of changing coefficients in one block will not interfere with the effects of changing coefficients in adjacent blocks.

If the coefficient at (i, j) in the $HL_1$ sub-band is changed by a quantity S (S can be either positive or negative), we will modify two coefficients of $LL_1$ sub-bands at (i, j) and (i, j+1) each by a quantity S/4. As a result, all the affected pixels in the corresponding 3×5 array will either increase (if S>0) or decrease (if S<0). Alternatively, if the $LH_1$ sub-band is used as the embedding carrier and we modify the coefficient at (i, j) in $LH_1$ sub-band by S, we need to change the two corresponding coefficients of $LL_1$ sub-bands at (i, j) and (i+1, j) by S/4. Similarly, all the affected pixels in the spatial domain will either increase (if S>0) or decrease (is S<0). As mentioned earlier in this document, in our algorithm, mean value change of a block is preferably achieved by changing all the coefficients with a mask value of '1' in FIG. 4 by the same amount. For each coefficient in the $HL_1$ or $LH_1$ sub-band whose value needs to be changed by S, we not only change its value by S, but also change two corresponding coefficients in the $LL_1$ sub-band by S/4 as discussed above.

Before the embedding process, error correction coding and chaotic mixing are preferably applied to the information bits to be embedded. The purpose of applying these two techniques in the preferred method is to improve the robustness of the method. The coded bit stream and the cover image are the input to the embedding system and method.

When embedding a bit into a block of IWT coefficients in $HL_1$ or $LH_1$ sub-band, $B_w$, we first find out the corresponding spatial block that could possibly be affected by the embedding, $B_s$. Then the pixel grayscale values of $B_s$ are preferably checked, and the block is preferably classified into four categories illustrated in FIG. 5.

A: The block has no pixel grayscale values greater than (255-$S_{max}$), namely 255-zone, or smaller than $S_{max}$, i.e., 0-zone.
B: The block has pixel grayscale values smaller than $S_{max}$ but no pixel values greater than (255-$S_{max}$).
C: The block has pixel grayscale values greater than (255-$S_{max}$) but no pixel values smaller than $S_{max}$
D: The block has both pixel grayscale values smaller than $S_{max}$ and greater than (255-$S_{max}$)

Different operations are applied to the different categories, which is one of the key points of this embodiment of the invention. The operations are presented below.

For Blocks of Type A:

In this case, overflow and underflow will not take place. We can either increase the mean value or decrease the mean value of the carrier sub-band ($HL_1$ or $LH_1$) coefficients in the block as discussed below. The mean value may be greater than zero or less than zero as is depicted in FIG. 5A. The detail is illustrated in FIG. 12. If a '1' bit is to be embedded, the mean value will be shifted away from 0 by the shift quantity S. Where the mean value is initially at a, it is preferably shifted to a'. Where the mean value is initially at b, it is preferably shifted to b'. In a preferred embodiment, we modify the corresponding coefficients in the LL sub-band by S/4 as described earlier in this document. For bit '0', the mean of the coefficients of this block will preferably remain unchanged.

For Blocks of Type B.

Figure 13:
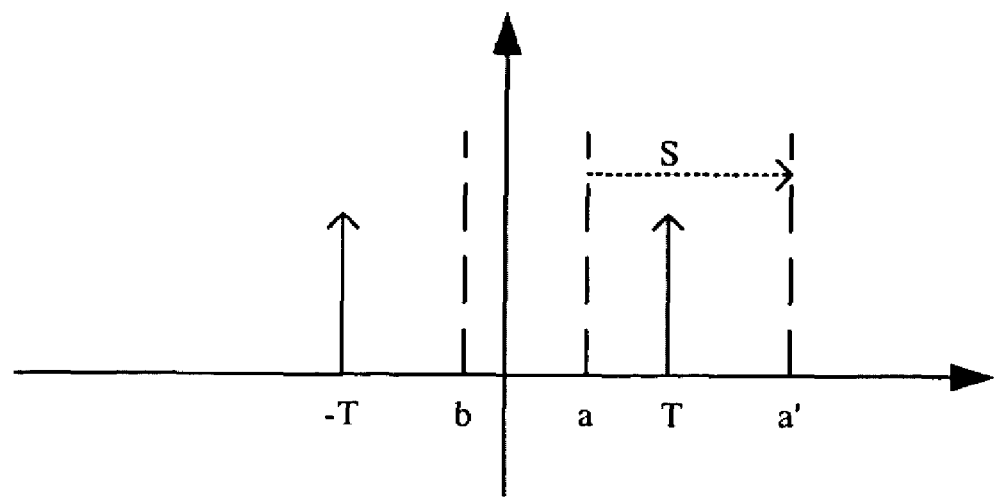
FIG. 13 is a graph illustrating a data embedding rule for a block of type B in accordance with one or more aspects of the present invention.

In a preferred embodiment, the blocks of type B have some pixel grayscale values only in the 0-zone as illustrated in FIG. 5B. Overflow will not occur for this type of blocks. To embed a bit '0', the block is preferably left unchanged. To embed a bit '1', the absolute value of the mean is preferably shifted by S. If the original mean value is greater than or equal to zero, as is the case of -a- in FIG. 13, the mean can be shifted to -a'-. Besides, we modify the corresponding coefficients in the LL sub-band by S/4. As a result, the pixel values in the spatial domain will only increase after changes are made. Therefore, underflow is avoided. If the mean value is negative, as with -b-, to make the absolute value of the mean value greater than T, the mean value can only be subtracted from by the amount of the shift quantity S. However, underflow may happen as this subtraction is performed. Hence, the mean value -b- preferably is not shifted. But, leaving the block unchanged corresponds to embedding a bit '0'. Therefore, error correction coding is preferably employed to correct any resulting errors.

For Blocks of Type C.

Figure 14:
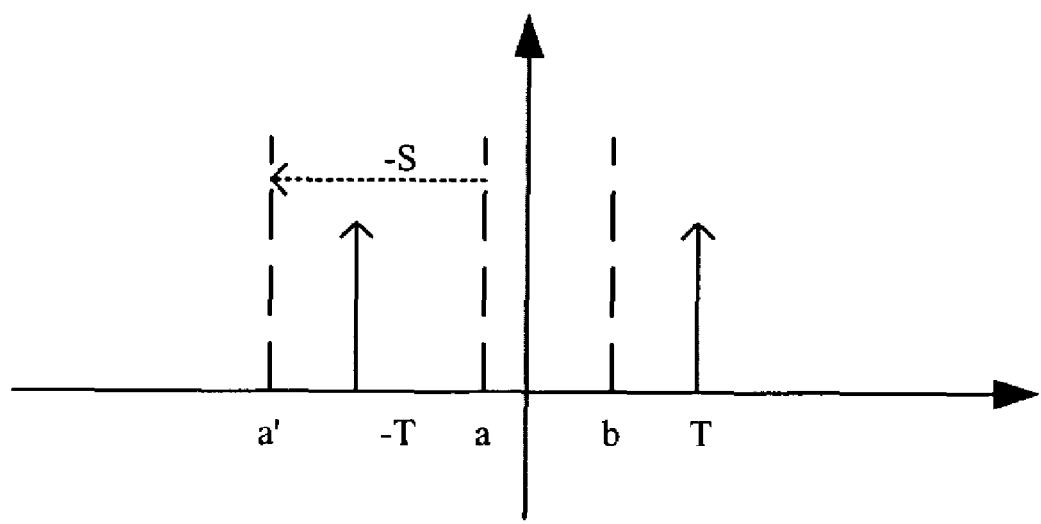
FIG. 14 is a graph illustrating a data embedding rule for a block of type C in accordance with one or more aspects of the present invention.

In a preferred embodiment, the blocks of this type have some pixel grayscale values only in the 255-zone as illustrated in FIG. 5C. This case is similar to the previous one except everything is opposite to the type B blocks. To embed bit '0', no operation is needed. To embed a bit '1', only the blocks with a negative mean coefficient value can be used to hide bit '1'. If bit '1' is to be embedded and the mean value of the block is positive, we will not be able to embed the bit. Instead, in this situation, the block is preferably left unchanged, which is equivalent to embedding a "0" bit. Thus, an erroneous bit may be embedded. Preferably, error correction coding (ECC) and/or error correction decoding (ECD) are employed to correct any such bit errors. FIG. 14 illustrates the detail with respect to the mean values for a block of type C.

For Blocks of Type D.

Generally, this type of block simultaneously has some pixel grayscale values in the 0-zone and some grayscale values in the 255-zone, as is illustrated in FIG. 5D. Shifting the mean value in either direction will generally cause either overflow or underflow. If an information bit '0' is to be embedded here, there is no problem. However, if we need to embed a "1" bit, an error will occur. Again, we rely on ECC and/or ECD to rectify any resulting error bits.

It is noted that for frequently used images, most blocks belong to type A. For example, all blocks are type A blocks for the popular "Lena" image, marked versions of which are shown in FIGS. 21-22. For this types of blocks, ECC may not need to be used to correct the errors.

Figure 15:
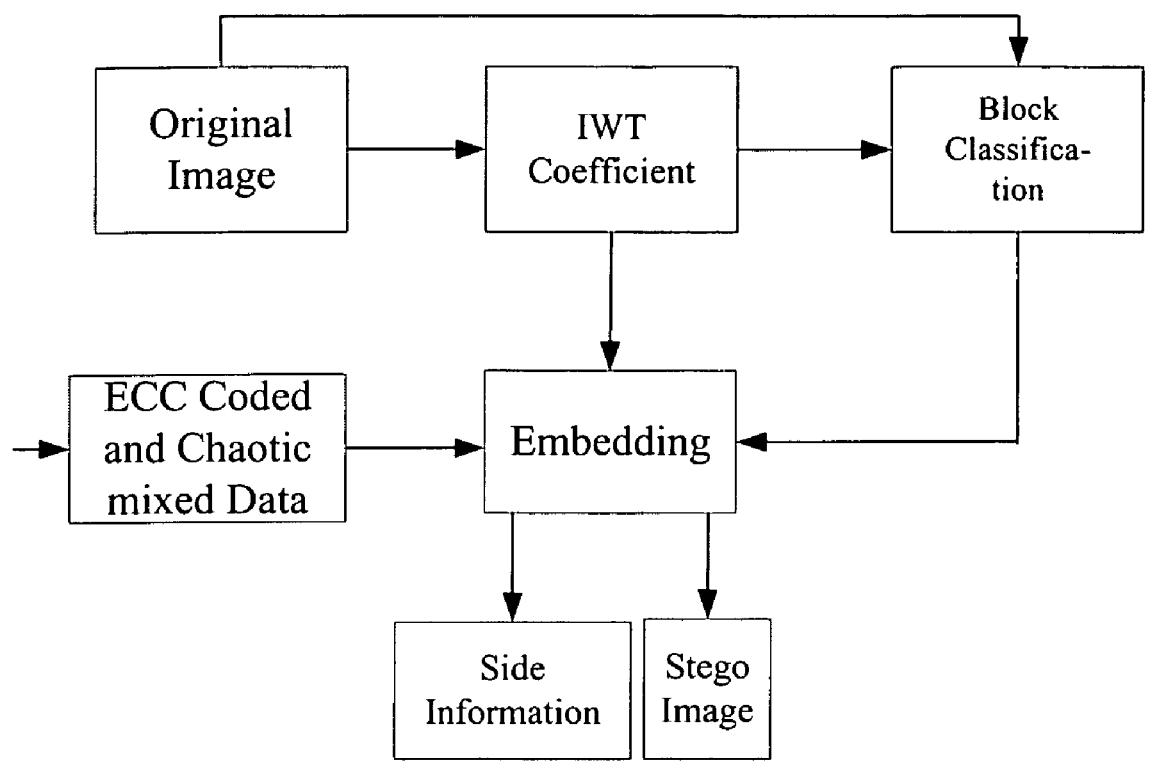
FIG. 15 is a block diagram of a system and method for data embedding in accordance with one or more aspects of the present invention.

In some cases, the errors may cluster together. This is called "burst error" in the literature. That is, blocks of type B, C, D may be concentrated in some region(s) of a given image. In this situation, ECC may not be able to efficiently correct the errors. Chaotic mixing (or other type of permutation) is preferably introduced to combat burst errors. It can disperse the burst errors evenly. FIG. 15 illustrates the block diagram of a method for data embedding in accordance with a preferred embodiment of the present invention.

In a preferred embodiment, the block size B, the threshold T, the shift quantity S, and an identification of the sub-band chosen as the carrier are saved as side information which can be later used for data extraction and recovery of cover media. From a different perspective, the side information can be treated as a key. In other words, it is preferably transmitted through a separate, secure channel. Preferably, only authorized persons can extract the hidden data with the provided side information. An alternative method is to use the same B, T, S, and sub-band for all images. As a result, the side information will preferably not be needed. The drawback of this alternative method is that the parameters may not be the optimal for an image processed in this manner.

Data Extraction and Original Image Recovering.

At the receiver side, a stego image is the input. Data extraction and original cover image restoration will be performed.

Hidden Data Extraction

In a preferred embodiment, the hidden data extraction needs the stego-image and/or the side information. Preferably, the high frequency integer wavelet coefficients of the stego-image are first obtained. Then the carrier sub-band is preferably divided into non-overlapping blocks of size B. Preferably, one bit of data is extracted from each block.

The comparison of the mean value with the threshold T can decide whether a bit '0' or a bit '1' is extracted. It is noted that if the test image is in the JPEG2000 format, the IWT coefficient can be obtained directly from the JPEG2000 bitstream without performing wavelet transform. Preferably, the data extraction will be efficient since no extra transformations are needed.

Hidden data extraction is preferably easier than embedding. In the IWT domain, if the data is embedded in the HL1 sub-band, we divide the sub-band into blocks in the same way as in the embedding stage. Then the mean value of the coefficients of each block is preferably calculated.

Preferably, for each block, the method then extracts one bit for the block and restores the mean coefficient value for the block to its original value. Specifically, the method preferably extracts a logical-1 bit if the absolute value of the post embedding, pre-extraction mean coefficient value is equal to or greater than the threshold T. Preferably, the method extracts a logical-0 bit value if the post-embedding, pre-extraction mean coefficient value for the block is less than the threshold T. Therefore, at the data extraction stage, the method preferably restores the original value of the mean coefficient value for the block by reversing the shifting operation that was conducted during the embedding stage. Specifically, after the data bit is extracted, the method preferably reduces the absolute value of the block's mean coefficient value by the magnitude of the shift quantity, S, used during the embedding process, while maintaining the sign of the mean coefficient value.

Preferably, for a '1'-bit block, the coefficients in the HL1 or LL1 sub-bands are shifted toward 0, back to their pre-embedding values. Consequently, the original IWT coefficients are recovered. It is noted that for hidden data extraction and original image recovering, there is preferably no need to go back to the spatial domain. This feature is very convenient for JPEG2000 images. In the foregoing, we have assumed that the initial mean value of each block is zero or close to zero, or at least is less than the threshold T. The latter is ensured since T is greater than the $m_{max}$ as defined in Fomula (2).

Cover Media Restoration

After all hidden data have been extracted, we can recover the original cover media. Two possibilities exist here. The first possibility is that the stego-image has not been subjected to any alteration. The other possibility is that the stego-image has undergone some alteration. With the first possibility, the original image can preferably be recovered. FIG. 16 is a flowchart illustrating a method for recovering the original image in accordance with one or more preferred embodiments of the prevent invention. It is noted that if the recovered image has been altered, the original cover image may not be fully recoverable.

Experimental Results and Performance Analysis.

Generally, the bit stream to be embedded is randomly generated using the randint( ) function of Matlab™. (Function randint generates a random scalar that is either zero or one, with equal probability.) We applied our algorithm to various images including those in the USC SIPI image database, the CorelDraw™ image database, and JPEG2000 test images. Our proposed algorithm works well for all of the test images. FIG. 17 is a marked medical image, and FIG. 18 is a marked JPEG2000 test image (N1A) generated using our proposed algorithm. Thus, the same amount of data is embedded into images of the same size. It is noted that the problem of salt-and-pepper noise is not incurred with the system and method disclosed herein and that the visual quality of stego-images produced by our proposed algorithm is much higher than that of the prior art. Specifically, the PSNR of the marked medical image (FIG. 17) with respect to its unmarked original version is 38.53 dB instead of 9.28 dB as with the prior art. And, for the NIA JPEG2000 test image, the PSNR is 42.67 dB (using the preferred system and method disclosed herein) instead of 18.01 dB with the prior art.

To analysis the performance of the proposed algorithm, we presents the testing results in detail with the Lena image, the most commonly used image in the image processing community, which is an 8-bit grayscale image with a size of 512×512.

Data Embedding Capacity

In our algorithm, the data embedding capacity is preferably determined by the block size B. The smaller the B is, the more blocks there will be. Consequently, more bits can be embedded. The table in FIG. 19 gives the relationship between the block size and capacity. Error correction coding is preferably used to enhance the robustness of our algorithm. The ECC coding scheme used here employs BCH codes [13]. However, other error correction coding/decoding methods may be employed. In general, the stronger the error correction capability is, the smaller the embedding capacity will be. BCH (15, 11) codes were used in this experimental investigation. The capacity can thus calculated as $$C_{capacity} = \frac{M \times N}{4 \times B \times B} \times \frac{11}{15} \qquad (8)(16)$$

where M, N are the size of the image, and where B is the block size. In FIG. 19, "Capacity with ECC" denotes the capacity determined with the formula above and is sometimes referred to as "pure payload," while "Capacity without ECC" indicates the capacity achieved if ECC is not used.

Visual Quality of Marked Images.

The visual quality of the stego-images with respect to the original image may be measured using the parameter of peak signal to noise ratio (PSNR).

From FIG. 19, it is seen that use of a smaller block size can provide larger data storage capacity. However, the $m_{max}$, the maximum absolute mean value of IWT coefficient in a block which was earlier defined in Formula (2), will be larger. Hence, a smaller block size generally requires that the shift quantity S be larger, thereby degrading the quality of the marked image, causing lower PSNR. The data in FIG. 20 tends to support this observation. Indeed, the "Minimum shift value" is defined as the smallest integer that is greater than $m_{max}$.

FIGS. 21 and 22 display the marked "Lena" images using the minimum shift values for different block sizes. We can see that the visual quality of the marked image of FIG. 21 is worse than that of FIG. 22. The PSNR of the image of FIG. 22(b) is 9 dB greater than that of the image of FIG. 22.

Figures 23, 24:
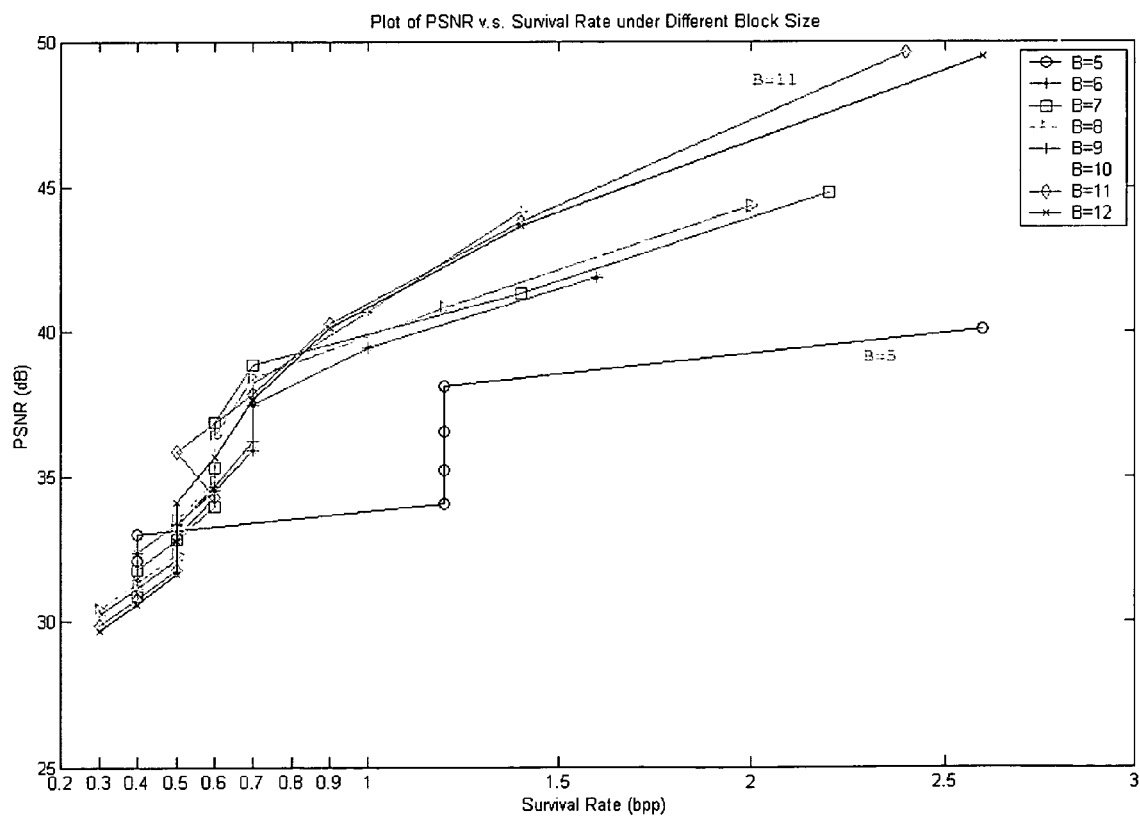
FIG. 23 is a data table showing values of PSNR occurring with various combinations of values of block size and shift quantity in accordance with one or more aspects of the present invention.
FIG. 24 is a graph plotting data survival rate versus PSNR for various block sizes in accordance with one or more aspects of the present invention.

Using the same block size, different shift values can be applied. Later, we will see that the larger the shift value is, the more robust the stego-image becomes. FIG. 23 reveals the PSNRs of stego-images with different block sizes and different shift values. We can see that the price for a larger shift value is a lower PSNR value, i.e. lower image quality.

Robustness of Hidden Data.

Different from most lossless watermarking algorithms, the proposed IWT based lossless watermarking algorithm is robust to incidental alterations.

At first, it is robust to JPEG2000 compressions. In experimental study, the marked images are JPEG2000-lossy-compressed with increasing compression ratios. The robustness against JPEG2000 compression is measured by data survival rate, meaning that when the resultant data rate after compression is above or equal to the data survival data rate, the hidden data can be reliably extracted without error. In other words, the lower the data survival rate is, the more robust the stego-image is.

FIG. 24 shows the relationship between the PSNR of a stego-image and the data survival rate under different block sizes. It can be observed that in general for a given block size B the lower the PSNR, the lower the data survival rate. For a given data survival rate, if a larger block size is chosen, the higher PSNR can be achieved which will lead to better image quality but lower data embedding capacity. It is obvious that the image visual quality, the robustness of hidden data, and the embedding capacity are all interrelated and some are conflict with one another. We cannot achieve the best performance for all of these aspects simultaneously. Generally, for each specific application, an optimum combination of these characteristics can be achieved.

In addition to compression, the proposed watermarking scheme is robust in the face of the use of a median filter as well. A median filter with the size of 3 by 3 can be applied to the stego-images. Then, hidden data extraction is preferably performed on the filtered stego-images. FIG. 25 lists the test results in which the number of decoded error bits is measured during the data extraction procedure. It is obvious that a larger block size and a larger shift value will make the marked image more robust against a median filter.

Additive Gaussian noise is type of noise frequently encountered in communication systems. In our experiments, a Gaussian noise with a zero mean and variance of 0.001 is added to the marked images. The error bits in hidden data extraction are counted, and FIG. 26 lists the results. As before, a conclusion can be drawn that, in general, the larger the block size the shift value are, the more robust the stego image will be.

Herein, a new semi-fragile lossless data hiding scheme is disclosed. Data are embedded into the integer wavelet domain. The preferred method disclosed herein can preferably be seamlessly integrated into the JPEG2000 standard. The issues of overflow and underflow are addressed herein. The original cover media can be recovered after hidden data extraction if the marked image has not been altered. The hidden data are robust to non-malicious attacks, e.g. lossy compression, to a certain degree. Performance analysis is conducted which shows the advantages of the proposed algorithm. The visual quality of the marked image is excellent. Salt-and-pepper noise and other artifacts are successfully avoided in the stego-images. It can be applied to content-based image authentication and some other applications.

The entire disclosures of the following documents are all hereby incorporated herein by reference.

[1] D. Zou, C. W. Wu, G. Xuan and Y. Q. Shi, "A content-based image authentication system with lossless data hiding," *Proc. of IEEE* International Conference on Multimedia and Expo, vol. 2, pp. 6-9, Baltimore, Md., July 2003.

[2] C. W. Honsinger, P. Jones, M. Rabbani, and J. C. Stoffel, "Lossless recovery of an original image containing embedded data," U.S. Pat. No. 6,278,791, 2001.

[3] J. Fridrich, M. Goljan and R. Du, "Invertible authentication," Proc. of SPIE, Security and Watermarking of Multimedia Contents, vol. 4314, pp. 197-208, San Jose, Calif., January 2001.

[4] M. Goljan, J. Fridrich, and R. Du, "Distortion-free data embedding," Proc. of $4^{th}$ Information Hiding Workshop, vol. 2137, pp. 27-41, Pittsburgh, Pa., April, 2001.

[5] G. Xuan, J. Chen, J. Zhu, Y. Q. Shi, Z. Ni, W. Su, "Distortionless data hiding based on integer wavelet transform," IEEE Electronics Letters, vol. 38, issue. 25, pp. 1646-1648, December 2002.

[6] Z. Ni, Y. Q. Shi, N. Ansari, S. Wei, "Reversible data hiding," Proc. of the International Symposium on Circuits and Systems 2003, vol. 2, pp. 25-28, Bangkok, Thailand, May 2003.

[7] C. De Vleeschouwer, J. F. Delaigle, B. Macq, "Circular interpretation of bijective transformations in lossless watermarking for media asset management," IEEE Transactions on Multimedia, vol. 5, pp. 97-105, March 2003.

[8] A. Skodras, C. Christopoulos, T. Ebrahimi, "The JPEG2000 still image compression standard;" IEEE Signal Processing Magazine, vol. 18, issue. 5, pp 36-58, September 2001.

[9] C. Christopoulos, A. Skodras, T. Ebrahimi, "The JPEG2000 still image coding system: an overview," IEEE Trans. On Consumer Electronics, vol. 46, no. 4, pp. 1103-1127, November 2000.

[10] L. Gall and A. Tabatabai, "Sub-band coding of digital images using symmetric short kernel filters and arithmetic coding techniques", Proc. of IEEE International Conference on Acoustics, Speech and Signal Processing, NY, pp. 761-765, 1988.

[11] A. R. Calderbank, I. Daubechies, W. Sweldens, and B.-L. Yeo, "Wavelet transforms that map integers to integers," Applied and Computational Harmonic Analysis (ACHA), vol. 5, pp. 332-369, 1998.

[12] JPEG 2000 Part I Final Committee Draft Version 1.0. ISO/IEC JTC 1/SC 29/WG 1 N1646R Available: http://wwwjpeg.org/public/fcd15444-1.pdf.

[13] J. G. Proakis, Digital Communications, Third Edition, McGraw-Hill, Inc. NY, 1995.

[14] G. Voyatzis and I. Pitas, "Chaotic mixing of digital images and applications to watermarking," Proceedings of European Conference of Multimedia Applications, Services Techniques (ECMAST'96), pp. 687-695, May 1996.

[15] USC image database. Available: http://sipi.usc.edu/services/database/Database.html Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of embedding into an image additional information that is not part of the image, the method comprising:
   dividing a frequency sub-band of the image into a plurality of blocks and providing a block of IWT (integer wavelet transform) coefficients for one of the plurality of blocks;
   determining a mean value of said coefficients within said block; and
   establishing an adjusted mean value to embed one of a logical-0 bit value and a logical-1 bit value, corresponding to said additional information, into said block by adjusting multiple coefficient values within a portion of the block that is less than the entire block, according to said logical-0 bit value or said logical-1 bit value,
   wherein the adjusting multiple coefficient values comprises:
      removing interference from neighboring IWT-coefficient blocks by applying a mask to said block, and
      adjusting selected coefficients within said block based on corresponding positions in the mask.

2. The method of claim 1 wherein said establishing comprises:
   maintaining said mean value unchanged to embed a logical-0 value into said block.

3. The method of claim 1 wherein said establishing comprises:
   changing said mean value to embed a logical-1 bit value into said block.

4. The method of claim 3 wherein said changing comprises:
   shifting at least one coefficient of a block in an $HL_1$ sub-band by a shift quantity.

5. The method of claim 4 wherein said changing further comprises:
   shifting at least one coefficient of an associated block in an $LL_1$ sub-band by about one quarter of said shift quantity.

6. the method of claim 1 further comprising:
   correcting any erroneous bit arising from said establishing using an error correction code.

7. The method of claim 1 further comprising:
   identifying a distribution of grayscale values of pixels in a spatial-domain block affected by said IWT coefficients; and
   customizing said establishing according to said grayscale-value distribution.

8. the method of claim 1 wherein said IWT coefficients comprise:
   $HL_1$ coefficients.

9. The method according to claim 1, further comprising:
   dividing IWT coefficients for at least one frequency band of an image into a plurality of non-overlapping blocks and selecting said block of IWT coefficients from among said plurality of non-overlapping blocks; and
   wherein said establishing an adjusted mean value comprises modifying said mean value to embed one or more bits of data.

10. The method of claim 9 further comprising:
    identifying at least one coefficient eligible for modification by said modifying and at least one coefficient to remain unchanged during said modifying.

11. The method of claim 9 wherein said modifying said mean value comprises:
    adding a shift quantity to said mean value.

12. The method of claim 9 wherein said modifying said mean value comprises:
    subtracting a shift quantity from said mean value.

13. The method of claim 1, wherein the portion of the block is defined by masking the coefficients corresponding to one or more edges of the block.

14. The method of claim 1, wherein establishing the adjusted mean value comprises:
    selecting a shift value by which to shift the mean value to establish the adjusted mean value.

15. The method of claim 14, wherein said selecting is performed based on a distribution of values of the coefficients of the block.

16. The method of claim 14, further comprising:
    adjusting at least one coefficient in another frequency sub-band of said image to compensate for an adjustment to at least one of the coefficients of the block.

17. A method, comprising:
    dividing at least one frequency sub-band of an image into a plurality of blocks and providing a block of IWT (integer wavelet transform) coefficients for one of the plurality of blocks;
    determining a mean value of said coefficients within said block;
    establishing an adjusted mean value to embed one of a logical-0 bit value and a logical-1 bit value into said block, wherein said logical-0 or logical-1 bit value corresponds to information extraneous to said image to be embedded into said image, wherein said adjusted mean value is obtained by adjusting multiple coefficient values within a portion of the block that is less than the entire block, according to said logical-0 bit value or said logical-1 bit value;
    wherein the adjusting multiple coefficient values comprises removing interference from neighboring IWT-coefficient blocks by applying a mask to said block;
    either transmitting or storing said image, including said first block;
    obtaining said image;
    dividing IWT coefficients for at least one frequency band of said image into a plurality of non-overlapping blocks;
    determining a mean value of coefficients within a first block of said blocks;
    comparing said mean value to a threshold; and
    extracting a bit value from said block based on said comparing.

18. An apparatus for embedding into an image additional information that is not part of the image, the apparatus comprising:
    a dividing means for dividing a frequency sub-band of the image into a plurality of blocks and provide a block of IWT (integer wavelet transform) coefficients for one of the plurality of blocks;
    a determining means for determining a mean value of said coefficients within said block; and
    an establishing means for establishing an adjusted mean value to embed one of a logical-0 bit value and a logical-1 bit value, corresponding to said additional information, into said block by adjusting multiple coefficient values within a portion of the block that is less than the entire block, according to said logical-0 bit value or said logical-1 bit value,
    wherein the establishing means comprises means for removing interference from neighboring IWT-coefficient blocks by applying a mask to said block.

19. An apparatus, comprising:
    dividing means for dividing at least one frequency sub-band of an image into a plurality of blocks and providing a block of IWT (integer wavelet transform) coefficients for one of the plurality of blocks;

determining means for determining a mean value of said coefficients within said block;

establishing means for establishing an adjusted mean value to embed one of a logical-0 bit value and a logical-1 bit value into said block, wherein said logical-0 or logical-1 bit value corresponds to information extraneous to said image to be embedded into said image, wherein said adjusted mean value is obtained by adjusting multiple coefficient values within a portion of the block that is less than the entire block, according to said logical-0 bit value or said logical-1 bit value, wherein the establishing means comprises means for removing interference from neighboring IWT-coefficient blocks by applying a mask to said block, wherein the adjusting multiple coefficient values comprises adjusting selected coefficients within said block based on corresponding positions in the mask;

means for either transmitting or storing said image, including said first block;

obtaining means for obtaining said image;

dividing means for dividing IWT coefficients for at least one frequency band of said image into a plurality of non-overlapping blocks;

determining means for determining a mean value of coefficients within a first block of said blocks;

comparing means for comparing said mean value to a threshold; and extracting means for extracting a bit value from said block based on said comparing.

* * * * *